(12) United States Patent
Matsumoto et al.

(10) Patent No.: US 11,143,294 B2
(45) Date of Patent: Oct. 12, 2021

(54) TRANSMISSION RATIO CONTROLLER AND METHOD FOR DETERMINING TRANSMISSION RATIO ABNORMALITY

(71) Applicant: TOYOTA JIDOSHA KABUSHIKI KAISHA, Toyota (JP)

(72) Inventors: Takuya Matsumoto, Miyoshi (JP); Akihiro Katayama, Toyota (JP); Yuki Ikejiri, Nishio (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/945,973

(22) Filed: Aug. 3, 2020

(65) Prior Publication Data

US 2021/0080003 A1    Mar. 18, 2021

(30) Foreign Application Priority Data

Sep. 18, 2019   (JP) .............................. JP2019-169719

(51) Int. Cl.
*F16H 61/12* (2010.01)
*F16H 61/02* (2006.01)

(52) U.S. Cl.
CPC ......... *F16H 61/12* (2013.01); *F16H 61/0213* (2013.01)

(58) Field of Classification Search
CPC .... F16H 59/70; F16H 59/74; F16H 2059/704; F16H 61/0213; F16H 61/12; F16H 2061/0227; F16H 2061/1208
See application file for complete search history.

(56) References Cited

U.S. PATENT DOCUMENTS

| | | | | |
|---|---|---|---|---|
| 5,588,936 A | * | 12/1996 | Uchida | F16H 61/0213 477/155 |
| 6,125,316 A | * | 9/2000 | Sasaki | F16H 61/12 192/3.3 |
| 9,382,867 B2 | * | 7/2016 | Ando | B60W 20/50 |
| 2008/0140290 A1 | * | 6/2008 | Kuwahara | B60W 10/06 701/54 |
| 2014/0297161 A1 | * | 10/2014 | Stanek | F02D 41/30 701/104 |

FOREIGN PATENT DOCUMENTS

JP   2007-309264 A   11/2007

* cited by examiner

*Primary Examiner* — Edwin A Young
(74) *Attorney, Agent, or Firm* — Oblon, McClelland, Maier & Neustadt, L.L.P.

(57) ABSTRACT

A transmission ratio controller includes circuitry. The circuitry includes a transmission ratio calculator configured to calculate a request transmission ratio to a transmission mechanism, a transmission ratio instructor configured to output a control signal based on the request transmission ratio, and an abnormality determiner configured to determine whether a transmission ratio of the transmission mechanism is abnormal. At least two of the request transmission ratio, an instruction transmission ratio corresponding to the control signal, or an actual transmission ratio achieved by the transmission mechanism are transmission ratios subject to comparison. The abnormality determiner is configured to determine that when a difference obtained by comparing the transmission ratios subject to comparison is greater than or equal to a predetermined specified value, the transmission ratio of the transmission mechanism is abnormal.

5 Claims, 4 Drawing Sheets

TRANSMISSION RATIO CONTROLLER AND METHOD FOR DETERMINING TRANSMISSION RATIO ABNORMALITY

BACKGROUND

1. Field

The following description relates to relates to a transmission ratio controller and a method for determining an abnormality in transmission ratio that are used for a vehicle.

2. Description of Related Art

Japanese Laid-Open Patent Publication No. 2007-309264 describes a transmission ratio controller of a vehicle that restricts shifting of the transmission ratio of a transmission mechanism in accordance with a catalyst temperature of an internal combustion engine. More specifically, the transmission ratio controller of the vehicle restricts an upshift of the transmission mechanism to a higher gear as the catalyst temperature decreases.

As in the technique disclosed in the above-described patent document, the transmission ratio of the vehicle is determined based on various parameters. Then, a control signal corresponding to the determined transmission ratio is transmitted to a mechanism configured to actuate the transmission mechanism, so that the transmission mechanism achieves the transmission ratio. In this type of a device, the transmission ratio achieved by the transmission mechanism may differ from the transmission ratio that is determined based on the parameters due to an electronical signal error or a mechanical fault. However, in the technique disclosed in the above-described patent document, it is not assumed that the determined transmission ratio may differ from the transmission ratio achieved by the transmission mechanism, and such an abnormality in the transmission ratio cannot be detected.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a transmission ratio controller. The transmission ratio controller includes circuitry. The circuitry includes a transmission ratio calculator configured to calculate a request transmission ratio to a transmission mechanism in accordance with a state of an internal combustion engine, a transmission ratio instructor configured to transmit a control signal to an actuation mechanism based on the request transmission ratio, the actuation mechanism being configured to actuate the transmission mechanism, and an abnormality determiner configured to determine whether a transmission ratio of the transmission mechanism is abnormal. At least two of the request transmission ratio, an instruction transmission ratio that is a transmission ratio corresponding to the control signal, or an actual transmission ratio that is a transmission ratio achieved by the transmission mechanism are transmission ratios subject to comparison. The abnormality determiner is configured to determine that when a difference obtained by comparing the transmission ratios subject to comparison is greater than or equal to a predetermined specified value, the transmission ratio of the transmission mechanism is abnormal.

An aspect of the present disclosure provides a method for determining a transmission ratio abnormality. The method includes calculating a request transmission ratio to a transmission mechanism in accordance with a state of an internal combustion engine and transmitting a control signal to an actuation mechanism based on the request transmission ratio. The actuation mechanism is configured to actuate the transmission mechanism. At least two of the request transmission ratio, an instruction transmission ratio that is a transmission ratio obtained by converting the control signal, or an actual transmission ratio that is a transmission ratio achieved by the transmission mechanism are transmission ratios subject to comparison. The method further includes determining that when a difference obtained by comparing the transmission ratios subject to comparison is greater than or equal to a predetermined specified value, the transmission ratio of the transmission mechanism is abnormal.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of the present disclosure will now be described with reference to FIGS. 1 to 4. First, the schematic configuration of a vehicle 100 will be described.

Figure 1:
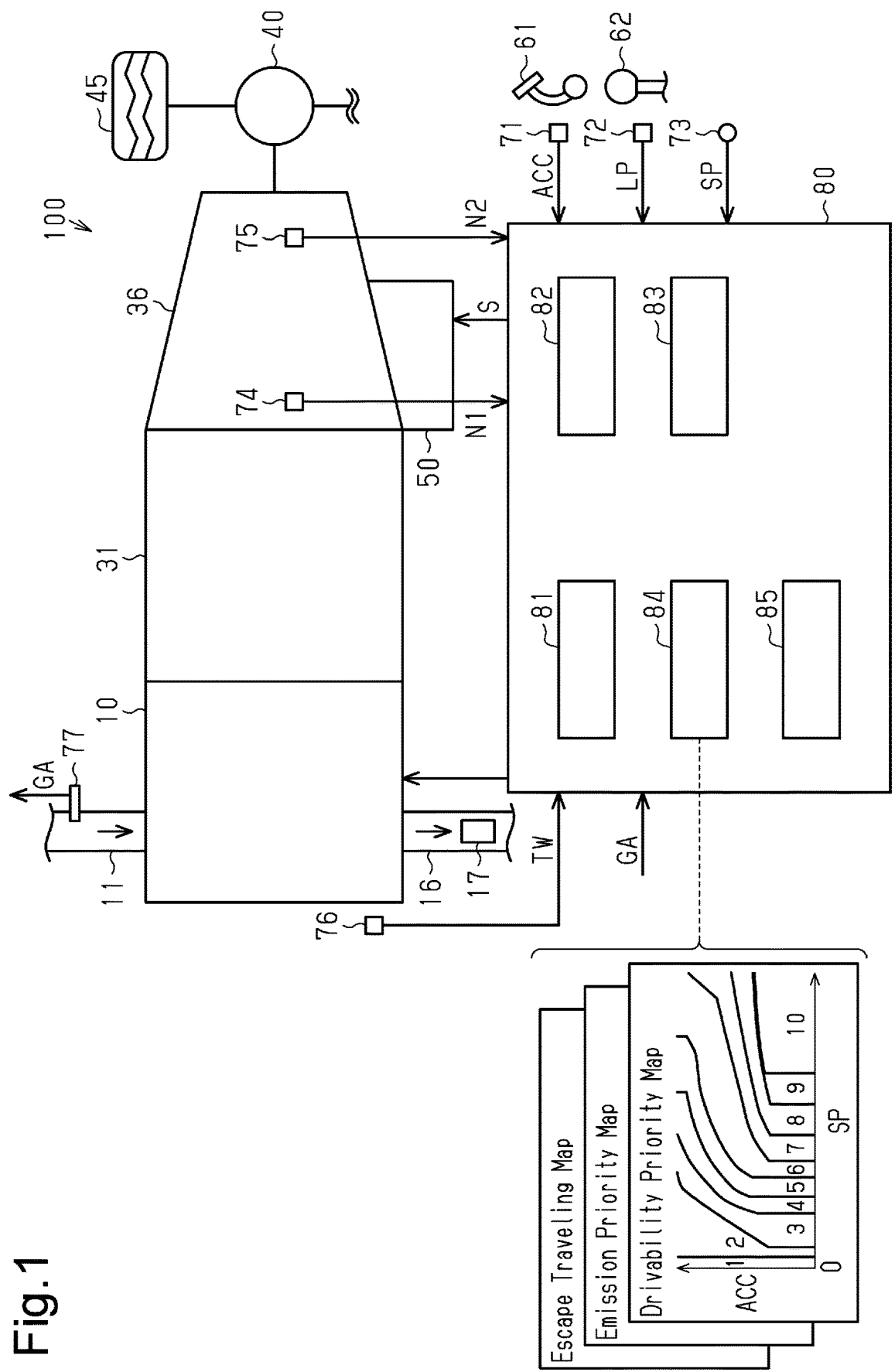
FIG. 1 is a schematic diagram showing the configuration of a vehicle.

As shown in FIG. 1, the vehicle 100 includes an internal combustion engine 10 including combustion chambers in which fuel burns. The combustion chambers of the internal combustion engine 10 are connected to an intake passage 11 that draws intake air into the combustion chambers. An airflow meter 77 is attached to an intermediate portion of the intake passage 11 to detect an intake air amount GA flowing through the intake passage 11. The combustion chambers of the internal combustion engine 10 are also connected to an exhaust passage 16 that discharges exhaust out of the combustion chambers. A catalyst 17 is arranged in an intermediate portion of the exhaust passage 16 to purify the exhaust. The catalyst 17 is a so-called three-way catalyst and removes HC, CO, NOx.

The internal combustion engine 10 includes a crankshaft to which an input shaft of a torque converter 31 is connected. The torque converter 31 includes a lock-up clutch (not shown) inside the torque converter 31. When the lock-up clutch is engaged, the input side and the output side of the torque converter 31 rotate integrally with each other. When the lock-up clutch is disengaged, torque is transmitted from the input shaft side to the output shaft side through hydraulic oil in the torque converter 31. More specifically, the torque converter 31 is used as a fluid coupling.

The torque converter 31 includes an output shaft coupled to an input shaft of a stepped transmission mechanism 36 that shifts the transmission ratio. The transmission mechanism 36 includes multiple planetary gear mechanisms and multiple clutches and brakes, which are frictional engagement elements configured to switch between an engaged state and a disengaged state. The transmission mechanism 36 changes elements in the engaged state and elements in the disengaged state among the frictional engagement elements, thereby changing a gear stage. A change in the gear stage changes the transmission ratio of the transmission mechanism 36. The transmission mechanism 36 includes an output shaft connected to left and right driving wheels 45 of the vehicle 100 by a differential gear 40.

A hydraulic mechanism 50 is filled with the hydraulic oil and coupled to the transmission mechanism 36. The hydraulic mechanism 50 controls the hydraulic oil supplied to the transmission mechanism 36 to change the gear stage of the transmission mechanism 36.

An input rotation speed sensor 74 is attached to the transmission mechanism 36 to detect an input rotation speed N1, which is the rotation speed of the input shaft of the transmission mechanism 36. Also, an output rotation speed sensor 75 is attached to the transmission mechanism 36 to detect an output rotation speed N2, which is the rotation speed of the output shaft of the transmission mechanism 36.

A water temperature sensor 76 is attached to the internal combustion engine 10 to detect a water temperature TW of a coolant that cools the internal combustion engine 10. The water temperature sensor 76 is attached to a downstream end of a water jacket defined in the internal combustion engine 10.

The vehicle 100 includes a shift lever 62 operated by the driver to be shifted to a non-travel position and a travel position. The non-travel position refers to a position in which the vehicle 100 does not travel and includes, for example, the parking position (P position) and the neutral position (N position). When the shift lever 62 is in the non-travel position, the transmission mechanism 36 configures a non-traveling gear stage. The travel position refers to a position in which the vehicle 100 travels and includes, for example, the forward travel position (D position) and the rearward travel position (R position). When the shift lever 62 is in the travel position, the transmission mechanism 36 configures a traveling gear stage. In the present embodiment, when the shift lever 62 is in the forward travel position, the transmission mechanism 36 is configured to provide ten gear stages, namely, "the first gear" to "the tenth gear." A lever position sensor 72 is attached to the vicinity of the shift lever 62 to detect a lever position LP, which is an operating position of the shift lever 62.

A vehicle speed sensor 73 is attached to the vehicle 100 to detect a vehicle speed SP, which is a travel speed of the vehicle 100. An accelerator operation sensor 71 is attached to the vehicle 100 to detect an accelerator operation amount ACC, which is an operation amount of an accelerator pedal 61 operated by the driver.

Signals from the above sensors are input to a controller 80 mounted on the vehicle 100. More specifically, the controller 80 receives a signal indicating the accelerator operation amount ACC from the accelerator operation sensor 71. The controller 80 receives a signal indicating the lever position LP from the lever position sensor 72. The controller 80 receives a signal indicating the vehicle speed SP from the vehicle speed sensor 73. The controller 80 receives a signal indicating the water temperature TW from the water temperature sensor 76. The controller 80 receives a signal indicating the input rotation speed N1 from the input rotation speed sensor 74. The controller 80 receives a signal indicating the output rotation speed N2 from the output rotation speed sensor 75. The controller 80 receives a signal indicating the intake air amount GA from the airflow meter 77.

The controller 80 includes a transmission ratio calculator 81 that calculates a request gear stage X1 in accordance with the state of the internal combustion engine 10. The request gear stage X1 is transmitted to the transmission mechanism 36 as a request value. The transmission ratio calculator 81 calculates the request gear stage X1 of the transmission mechanism 36 based on the accelerator operation amount ACC and the vehicle speed SP. The controller 80 further includes a transmission ratio instructor 85 that transmits a control signal S to the hydraulic mechanism 50, which actuates the transmission mechanism 36, based on the request gear stage X1. The transmission ratio instructor 85 controls the transmission mechanism 36 so that the gear stage of the transmission mechanism 36 is set to the request gear stage X1.

The controller 80 includes a monitor 82 that monitors the request gear stage X1 calculated by the transmission ratio calculator 81. The monitor 82 determines based on the request gear stage X1 calculated by the transmission ratio calculator 81 whether a calculated gear stage may vary in accordance with the temperature of the catalyst 17. The controller 80 further includes an abnormality determiner 83 that determines an abnormality in the transmission mechanism 36. The abnormality determiner 83 determines whether the gear stage calculated by the transmission ratio calculator 81 is actually achieved by the transmission mechanism 36 to determine whether an abnormality is present.

The controller 80 includes storage 84 that stores in advance transmission ratio maps used to determine the gear stage of the transmission mechanism 36. The transmission ratio maps indicate gear stages that should be set by the transmission mechanism 36 in association with the vehicle speed SP and the accelerator operation amount ACC. In the transmission ratio maps of the present embodiment, the gear stages are specified in an orthogonal coordinate system in which the vehicle speed SP and the accelerator operation amount ACC are coordinate axes. In the transmission ratio map, multiple transmission lines for switching the gear stage are set in accordance with the number of gear stages.

In each transmission ratio map stored in the storage 84, at a same accelerator operation amount ACC, higher gear stages are selected as the vehicle speed SP increases. Also, at a same vehicle speed SP, lower gear stages are selected as the accelerator operation amount ACC increases.

The transmission ratio maps stored in the storage 84 include an emission priority map that prioritizes emission and a drivability priority map that prioritizes drivability. Typically, when a relatively low gear stage is used, the rotation speed of the crankshaft increases, which increases the combustion temperature of the combustion chambers. In accordance with increases in the combustion temperature of the combustion chambers, the exhaust having a high temperature flows into the catalyst 17. Thus, the use of a relatively low gear stage accelerates warm-up of the catalyst 17. In this regard, in the emission priority map, the gear stages are set taking into consideration the accelerated warm-up of the catalyst 17. More specifically, in the emission priority map, each transmission line is shifted toward a higher vehicle speed and is separated from an adjacent transmission line by a greater distance than in the drivability priority map. Thus, the emission priority map restricts an upshift of the gear stage more than the drivability priority map.

In addition, the storage 84 of the controller 80 stores an escape traveling map, which is a transmission ratio map that differs from the emission priority map and the drivability priority map. In the escape traveling map, a constant gear stage, which is, for example, "the fifth gear," is selected regardless of the accelerator operation amount ACC and the vehicle speed SP.

The transmission ratio calculator 81 of the controller 80 calculates a catalyst temperature TC, which is the temperature of the catalyst 17, based on the water temperature TW of the internal combustion engine 10 and an accumulated value of the intake air amount GA accumulated since the internal combustion engine 10 is started. The accumulated value of the intake air amount GA continues to increase from the starting of the internal combustion engine 10. Therefore, the transmission ratio calculator 81 calculates the catalyst temperature TC to be a greater value as the amount of time since the internal combustion engine 10 has started generally increases. The transmission ratio calculator 81 also calculates the catalyst temperature TC to be a greater value as the water temperature TW increases.

During normal traveling, the transmission ratio calculator 81 of the controller 80 selects one of the emission priority map and the drivability priority map from the multiple transmission ratio maps used to control the gear stage of the transmission mechanism 36 and calculates the request gear stage X1 based on the selected transmission ratio map. The transmission ratio calculator 81 of the controller 80 switches the selected transmission ratio map in accordance with the catalyst temperature TC. Thus, the catalyst temperature TC is a switching parameter used to switch the selected transmission ratio map. In the present embodiment, the catalyst temperature TC is a specified parameter that indicates the state of the internal combustion engine 10. In other words, the state of the internal combustion engine 10 is specified by the catalyst temperature TC used as the specified parameter.

When the water temperature TW is greater than or equal to a boil determination value B, the transmission ratio calculator 81 of the controller 80 selects the escape traveling map from the multiple transmission ratio maps and calculates the request gear stage X1 based on the selected transmission ratio map. When the water temperature TW is greater than or equal to the boil determination value B, the transmission ratio calculator 81 of the controller 80 selects the escape traveling map regardless of the catalyst temperature TC.

The controller 80 may be configured to be circuitry including one or more processors that execute various processes in accordance with a computer program (software). The controller 80 may be configured to be circuitry including one or more dedicated hardware circuits such as an application specific integrated circuit (ASIC) that execute at least some of the various processes or a combination of these. The processor includes a CPU and memory such as RAM and ROM. The memory stores program codes or instructions configured to cause the CPU to execute processes. The memory, or a computer readable medium, includes any type of medium that is accessible by a general-purpose computer or a dedicated computer.

Transmission ratio control executed by the transmission ratio calculator 81 and the transmission ratio instructor 85 of the controller 80 will now be described.

The transmission ratio calculator 81 of the controller 80 executes the transmission ratio control when the shift lever 62 is in the forward travel position on condition that the vehicle speed SP is greater than 0 km/hr, that is, on condition that the vehicle 100 is traveling forward. While the vehicle 100 continues to travel forward, the transmission ratio calculator 81 repeatedly executes the transmission ratio control in a predetermined control cycle. The transmission ratio calculator 81 stores a detection value of each sensor that was referred to during the previous execution of the transmission ratio control until the next execution of the transmission ratio control. In addition, the transmission ratio calculator 81 repeatedly calculates the catalyst temperature TC in the background.

Figure 2:
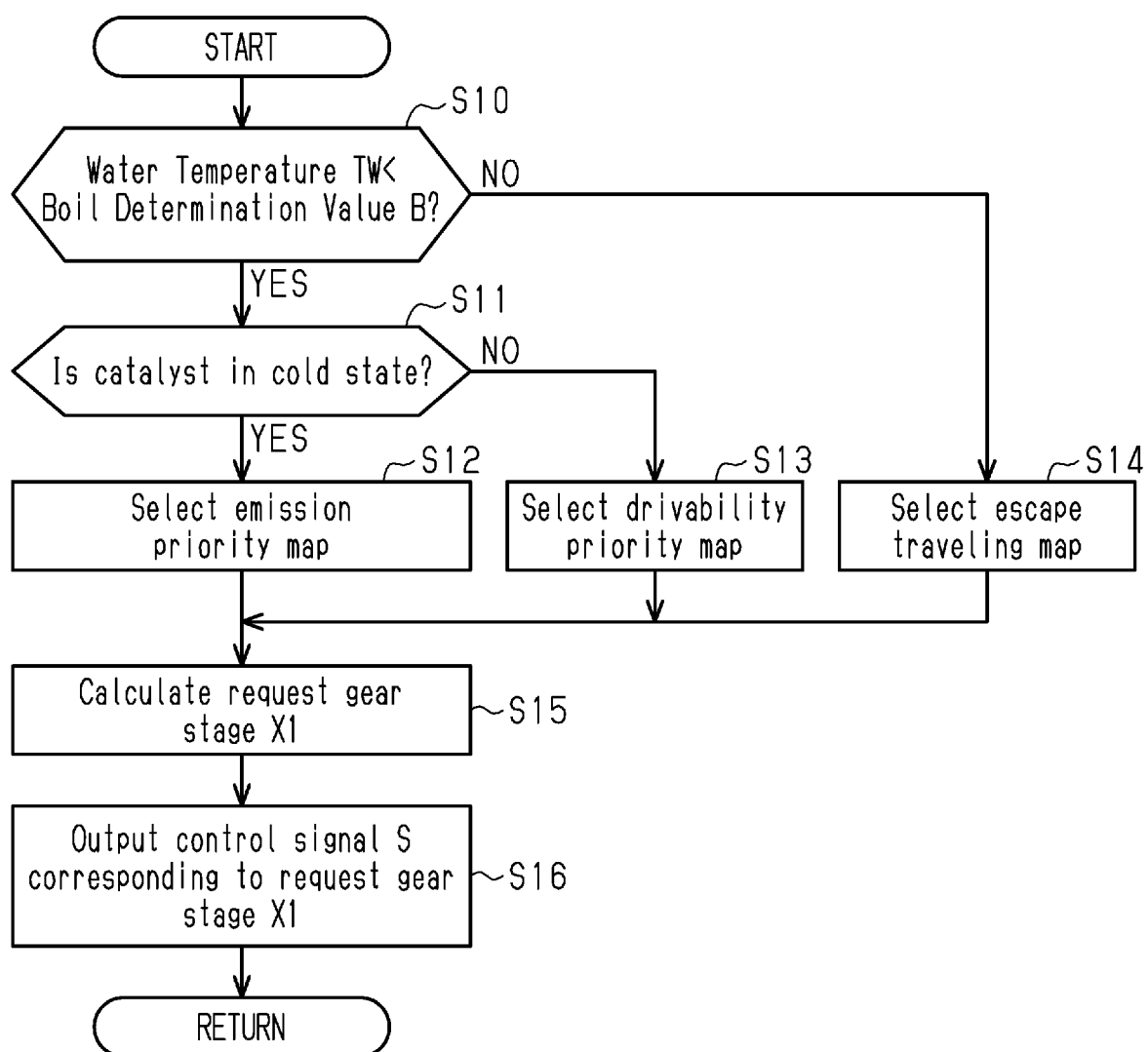
FIG. 2 is a flowchart of a transmission ratio control.

As shown in FIG. 2, when a transmission ratio control series is started, the transmission ratio calculator 81 executes step S10. In step S10, the transmission ratio calculator 81 determines whether the water temperature TW is less than a predetermined boil determination value B. The boil determination value B is set to, for example, 95° C. If it is determined in step S10 that the water temperature TW is greater than or equal to the predetermined boil determination value B (S10: NO), the transmission ratio calculator 81 proceeds to step S14. In step S14, the transmission ratio calculator 81 selects the escape traveling map as the transmission ratio map used to control the gear stage of the transmission mechanism 36.

If it is determined in step S10 that the water temperature TW is less than the predetermined boil determination value B (S10: YES), the transmission ratio calculator 81 proceeds to step S11. In step S11, the transmission ratio calculator 81 determines whether the catalyst temperature TC is low, that is, whether the catalyst 17 is in a cold state. In a specific example, when the catalyst temperature TC is less than a predetermined warm-up determination temperature, the transmission ratio calculator 81 determines that the catalyst 17 is in the cold state. When the catalyst temperature TC is greater than or equal to the predetermined warm-up determination temperature, the transmission ratio calculator 81 determines that the catalyst temperature TC is high, that is, the catalyst 17 is in a warm state. The warm-up determination temperature is 300° C.

If it is determined in step S11 that the catalyst 17 is in the cold state (S11: YES), the transmission ratio calculator 81 proceeds to step S12. That is, when the catalyst is cold, the transmission ratio calculator 81 proceeds to step S12. In step S12, the transmission ratio calculator 81 selects the emission priority map as the transmission ratio map used to control the gear stage of the transmission mechanism 36.

If it is determined in step S11 that the catalyst 17 is in the warm state (S11: NO), the transmission ratio calculator 81 proceeds to step S13. That is, when the catalyst is warm, the transmission ratio calculator 81 proceeds to step S13. In step S13, the transmission ratio calculator 81 selects the drivability priority map as the transmission ratio map used to control the gear stage of the transmission mechanism 36.

Subsequent to step S12, S13, or S14, the transmission ratio calculator 81 proceeds to step S15. In step S15, the transmission ratio calculator 81 calculates the request gear stage X1. In step S15, the transmission ratio map selected in one of steps S12 to S14 is referred to. The gear stage corresponding to the present vehicle speed SP and the present accelerator operation amount ACC in the selected transmission ratio map is calculated as the request gear stage X1 of the present moment. As described above, if step S15 is reached through step S14, the gear stage is calculated with reference to the escape traveling map. As a result, "the fifth gear" is calculated as the request gear stage X1 of the present moment regardless of the accelerator operation amount ACC, the vehicle speed SP, and the catalyst temperature TC. Subsequently, the transmission ratio calculator 81 proceeds to step S16.

In step S16, the transmission ratio instructor 85 generates a control signal S corresponding to the calculated request gear stage X1 and transmits the control signal S to the hydraulic mechanism 50. Subsequently, the transmission ratio control series is ended, and step S10 is again executed. In addition, the hydraulic mechanism 50*i* controls the hydraulic oil supplied to the transmission mechanism 36 in accordance with the control signal S transmitted in step S16. As a result, the transmission mechanism 36 achieves the gear stage corresponding to the request gear stage X1.

Precondition determination control executed by the monitor 82 of the controller 80 will now be described.

The monitor 82 executes the precondition determination control when the shift lever 62 is in the forward travel position on condition that the vehicle speed SP is greater than 0 km/hr, that is, on condition that the vehicle 100 is traveling forward. The monitor 82 repeatedly executes the precondition determination control in a predetermined control cycle during one trip that is from when the controller 80 starts to be supplied with power and starts operating to when the supply of power to the controller 80 is stopped and the controller 80 stops operating. However, when a precondition met flag, which indicates that the precondition is met, is set to ON for a trip, the monitor 82 stops the precondition determination control until the next trip starts. At a point in time when the controller 80 has started to operate, the precondition met flag is set to OFF.

Figure 3:
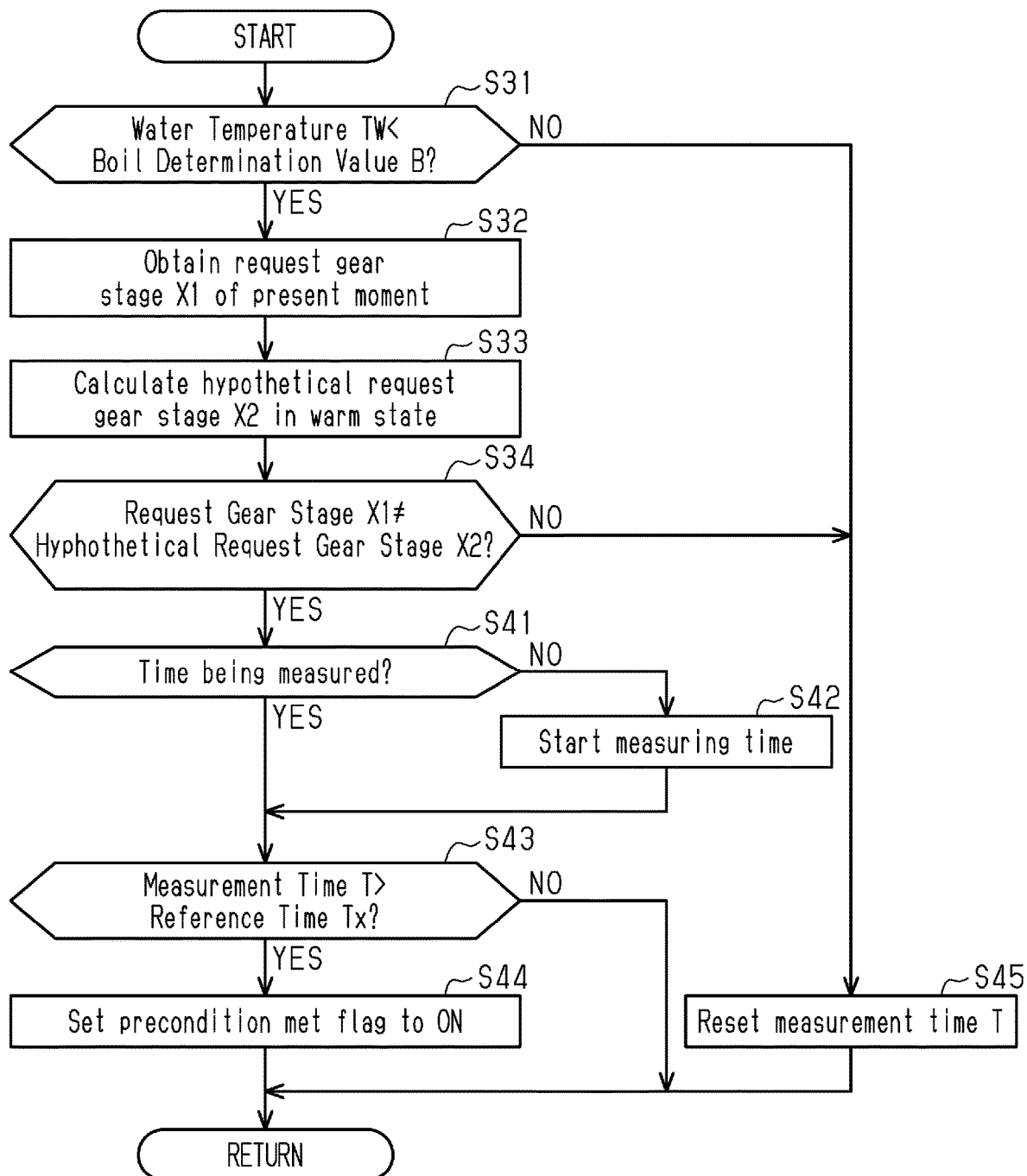
FIG. 3 is a flowchart of a precondition determination control.

As shown in FIG. 3, when a precondition determination control series is started, the monitor 82 of the controller 80 executes step S31. In step S31, the monitor 82 determines whether the water temperature TW is less than the predetermined boil determination value B. The boil determination value B referred to in step S31 is the same as the boil determination value B in step S10 of the transmission ratio control. If it is determined in step S31 that the water temperature TW is greater than or equal to the predetermined boil determination value B, that is, it is determined that the escape traveling map will be selected (S31: NO), the monitor 82 proceeds to step S45. If it is determined in step S31 that the water temperature TW is less than the predetermined boil determination value B, that is, it is determined that the emission priority map or the drivability priority map will be selected (S31: YES), the monitor 82 proceeds to step S32.

In step S32, the monitor 82 obtains the request gear stage X1 of the present moment. More specifically, among the request gear stages X1 calculated in the transmission ratio control executed by the transmission ratio calculator 81, the monitor 82 obtains the most recent request gear stage X1 as the request gear stage X1 of the present moment. Subsequently, the monitor 82 proceeds to step S33.

In step S33, the monitor 82 obtains the detection values of the sensors of the internal combustion engine 10 corresponding to when the request gear stage X1 obtained in step S32 was calculated. The state of the internal combustion engine 10 corresponding to when the request gear stage X1 obtained in step S32 was calculated corresponds to a first state. In the present embodiment, in the first state, for example, the catalyst temperature TC is less than the warm-up determination temperature. The state of the internal combustion engine 10 that is identical to the first state except the catalyst temperature TC corresponds to a second state. In the present embodiment, in the second state, the catalyst temperature TC is greater than or equal to the warm-up determination temperature. In step S33, the monitor 82 calculates a hypothetical request gear stage X2 corresponding to when it is assumed that the catalyst temperature TC is greater than or equal to the warm-up determination temperature (for example, the catalyst temperature TC is 400° C.) and that the state of the internal combustion engine 10 except for the catalyst temperature TC is identical to that of the point in time when step S32 was executed. Thus, in step S33, the monitor 82 uses the drivability priority map to calculate the hypothetical request gear stage X2 as the request gear stage corresponding to when it is assumed that the catalyst 17 is in the warm state and that the state of the internal combustion engine 10 except for the catalyst temperature TC is identical to that of when the request gear stage X1 obtained in step S32 was calculated. In other words, when the internal combustion engine 10 in the first state, the monitor 82 calculates a hypothetical transmission ratio (e.g., hypothetical request gear stage X2) based on the second state using a second transmission ratio map (e.g., drivability priority map). Subsequently, the monitor 82 proceeds to step S34.

In step S34, the monitor 82 determines whether the request gear stage X1 obtained in step S32 differs from the hypothetical request gear stage X2 calculated in step S33. If it is determined in step S34 that the request gear stage X1 obtained in step S32 equals the hypothetical request gear stage X2 calculated in step S33 (S34: NO), the monitor 82 proceeds to step S45.

If it is determined in step S34 that the request gear stage X1 obtained in step S32 differs from the hypothetical request gear stage X2 calculated in step S33 (S34: YES), the monitor 82 proceeds to step S41.

In step S41, the monitor 82 determines whether a measurement time T is being measured. If it is determined in step S41 that the measurement time T is being measured (S41: YES), the monitor 82 proceeds to step S43. If it is determined in step S41 that the measurement time T is not being measured (S41: NO), the monitor 82 proceeds to step S42.

In step S42, the monitor 82 starts to measure the measurement time T indicating time elapsed from when the affirmative determination is made in step S34. Subsequently, the monitor 82 proceeds to step S43.

In step S43, the monitor 82 determines whether the measurement time T is greater than a predetermined reference time Tx. An example of the reference time Tx is a few seconds to a few dozen seconds. If it is determined in step S43 that the measurement time T is less than or equal to the predetermined reference time Tx (S43: NO), the monitor 82 ends the present precondition determination control. If it is determined in step S43 that the measurement time T is greater than the predetermined reference time Tx (S43: YES), the monitor 82 proceeds to step S44.

In step S44, the monitor 82 sets the precondition met flag to ON. In the present embodiment, the setting of the precondition met flag to ON in step S44 corresponds to determining that the transmission ratios differ in accordance with the catalyst temperature TC, which is the specified parameter indicating the state of the internal combustion engine 10. Subsequently, the monitor 82 ends the present precondition determination control.

As described above, if the negative determination is made in step S31 or S34, the monitor 82 proceeds to step S45. In step S45, the monitor 82 stops measuring the measurement time T and resets the measurement time T. When the measurement time T is not being measured, the state is maintained. Subsequently, the monitor 82 ends the present precondition determination control.

Transmission ratio abnormality determination control executed by the abnormality determiner 83 of the controller 80 will now be described.

The abnormality determiner 83 of the controller 80 executes the transmission ratio abnormality determination control when the shift lever 62 is in the forward travel position on condition that the vehicle speed SP is greater than 0 km/hr, that is, on condition that the vehicle 100 is traveling forward. While the vehicle 100 continues to travel forward, the abnormality determiner 83 repeatedly executes the transmission ratio abnormality determination control in a predetermined control cycle.

Figure 4:
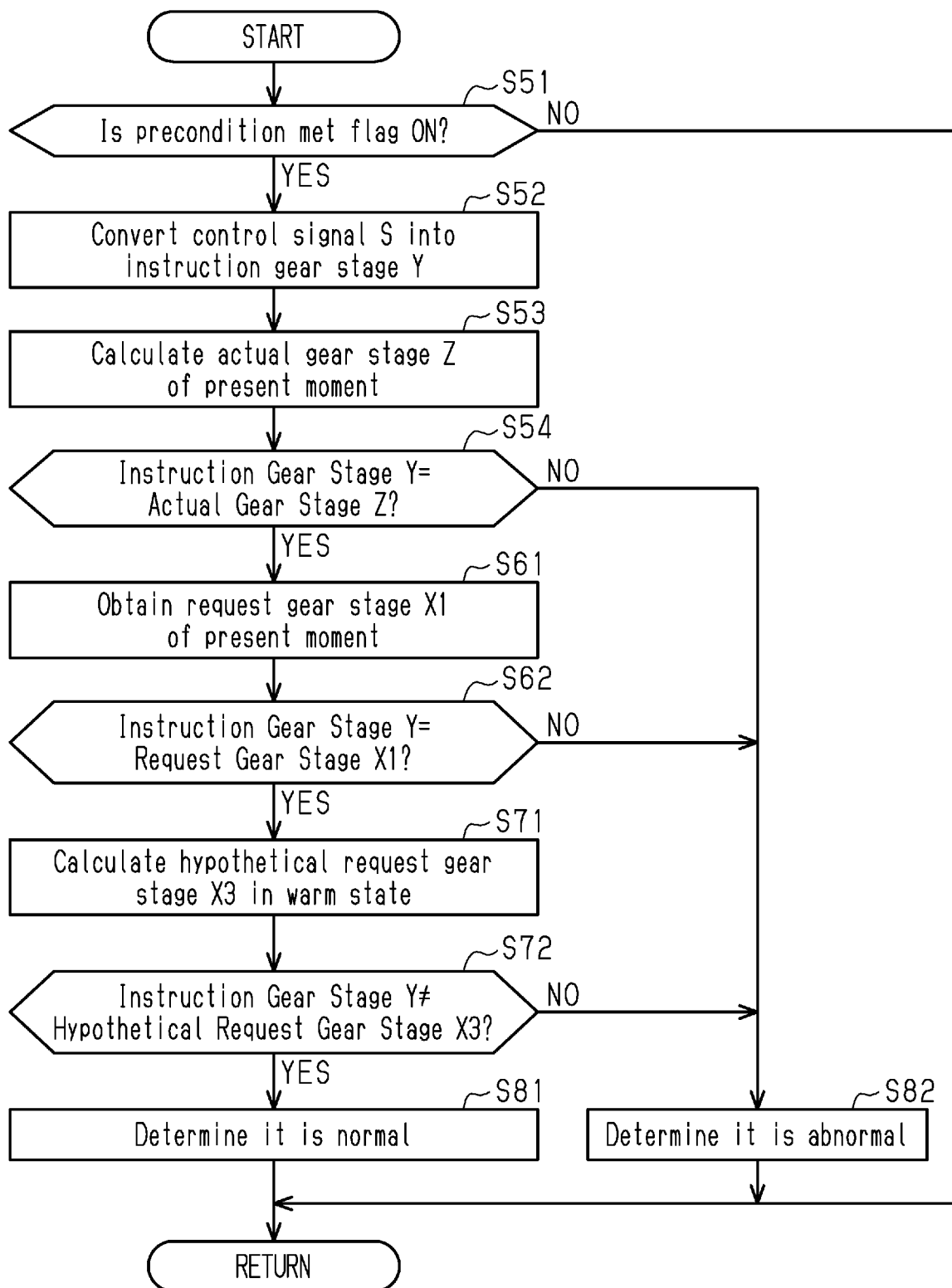
FIG. 4 is a flowchart of a transmission ratio abnormality determination control.

As shown in FIG. 4, when the transmission ratio abnormality determination control is started, the abnormality determiner 83 executes step S51. In step S51, the abnormality determiner 83 determines whether the precondition met flag determined in the precondition determination control, which is described above, is ON. If it is determined in step S51 that the precondition met flag is OFF (S51: NO), the abnormality determiner 83 ends the present transmission ratio abnormality determination control. If it is determined in step S51 that the precondition met flag is ON (S51: YES), the abnormality determiner 83 proceeds to step S52.

In step S52, the abnormality determiner 83 obtains a control signal S of the point in time when step S52 was executed. The obtained control signal S is converted into an instruction gear stage Y. More specifically, a gear stage is calculated through an inverse process of generating the control signal S in accordance with the request gear stage X1 in step S16 of the transmission ratio control. The gear stage is used as the instruction gear stage Y. Subsequently, the abnormality determiner 83 proceeds to step S53.

In step S53, the abnormality determiner 83 calculates an actual gear stage Z, that is, the actual gear stage of the transmission mechanism 36, based on the input rotation speed N1 and the output rotation speed N2. The transmission ratio of the transmission mechanism 36 is the ratio of the input rotation speed N1 to the output rotation speed N2. The abnormality determiner 83 calculates one of the multiple gear stages of the transmission mechanism 36 that achieves a transmission ratio closest to the ratio of the input rotation speed N1 to the output rotation speed N2 as the actual gear stage Z. Subsequently, the abnormality determiner 83 proceeds to step S54.

In step S54, the abnormality determiner 83 determines whether the instruction gear stage Y calculated in step S52 equals the actual gear stage Z calculated in step S53. If it is determined in step S54 that the instruction gear stage Y differs from the actual gear stage Z (S54: NO), the abnormality determiner 83 proceeds to step S82. If it is determined in step S54 that the instruction gear stage Y equals the actual gear stage Z (S54: YES), the abnormality determiner 83 proceeds to step S61.

In step S61, the abnormality determiner 83 obtains the request gear stage X1 of the present moment. More specifically, among the request gear stages X1 calculated in the transmission ratio control executed by the transmission ratio calculator 81, the abnormality determiner 83 obtains the most recent request gear stage X1 as the request gear stage X1 of the present moment. Subsequently, the abnormality determiner 83 proceeds to step S62.

In step S62, the abnormality determiner 83 determines whether the instruction gear stage Y calculated in step S52 equals the request gear stage X1 obtained in step S61. If it is determined in step S62 that the instruction gear stage Y differs from the request gear stage X1 (S62: NO), the abnormality determiner 83 proceeds to step S82. If it is determined in step S62 that the instruction gear stage Y equals the request gear stage X1 (S62: YES), the abnormality determiner 83 proceeds to step S71.

In step S71, the abnormality determiner 83 obtains the detection values of the sensors of the internal combustion engine 10 corresponding to when the control signal S was obtained in step S52. Then, the abnormality determiner 83 calculates a hypothetical request gear stage X3 corresponding to when it is assumed that the catalyst temperature TC is greater than or equal to the warm-up determination temperature (for example, the catalyst temperature TC is 400° C.) and that the state of the internal combustion engine 10 except for the catalyst temperature TC is identical to that of the point in time when the detection values of the sensors were obtained. Thus, in step S71, the abnormality determiner 83 uses the drivability priority map to calculate the hypothetical request gear stage X3 as the request gear stage corresponding to when it is assumed that the catalyst 17 is in the warm state. More specifically, in addition to the hypothetical request gear stage X2 calculated by the monitor 82, the abnormality determiner 83 further calculates the hypothetical request gear stage X3 corresponding to when the catalyst 17 is in the warm state. In other words, in step S71, when the precondition is met and the internal combustion engine 10 is in the first state, the abnormality determiner 83 calculates the hypothetical transmission ratio (e.g., hypothetical request gear stage X3) based on the second state using a second transmission ratio map (e.g., drivability priority map). Subsequently, the abnormality determiner 83 proceeds to step S72.

In step S72, the abnormality determiner 83 determines whether the instruction gear stage Y calculated in step S52 differs from the hypothetical request gear stage X3 calculated in step S71. If it is determined in step S72 that the instruction gear stage Y equals the hypothetical request gear stage X3 (S72: NO), the abnormality determiner 83 proceeds to step S82. If it is determined in step S72 that the instruction gear stage Y differs from the hypothetical request gear stage X3 (S72: YES), the abnormality determiner 83 proceeds to step S81.

In step S81, the abnormality determiner 83 determines that the transmission ratio of the transmission mechanism 36 is normal. The abnormality determiner 83 also sets the precondition met flag to OFF. Subsequently, the abnormality determiner 83 ends the present transmission ratio abnormality determination control.

As described above, if the negative determination is made in step S54, S62, or S72, the abnormality determiner 83 proceeds to step S82.

In step S82, the abnormality determiner 83 determines that the transmission ratio of the transmission mechanism 36 is abnormal. The abnormality determiner 83 also sets the precondition met flag to OFF. Subsequently, the abnormality determiner 83 ends the present transmission ratio abnormality determination control.

The operation of the present embodiment will now be described.

In the present embodiment, when the shift lever 62 is in the forward travel position and the vehicle speed SP is greater than 0 km/hr, the transmission ratio calculator 81 calculates the request gear stage X1 of the transmission mechanism 36 based on the vehicle speed SP and the accelerator operation amount ACC. The calculated request gear stage X1 is temporarily stored in, for example, a volatile memory incorporated in the controller 80. The transmission ratio instructor 85 retrieves the stored request gear stage X1, and the control signal S corresponding to the request gear stage X1 is output from the transmission ratio instructor 85. When receiving the control signal S, the hydraulic mechanism 50 operates in accordance with the control signal S. The transmission mechanism 36 operates in accordance with the operation of the hydraulic mechanism 50. As a result, the actual gear stage Z of the transmission mechanism 36 becomes the same gear stage as the request gear stage X1.

The advantages of the present embodiment will now be described.

(1) In the embodiment, when a transmission ratio control series is executed normally, all of the request gear stage X1, the instruction gear stage Y, and the actual gear stage Z are expected to be the same. In other words, when a control series related to the transmission ratio is executed normally, it is expected that all of (a) the request transmission ratio calculated in accordance with the state of the internal combustion engine, (b) the instruction transmission ratio corresponding to a control signal corresponding to the request transmission ratio, and (c) the actual transmission ratio adjusted by operation of an actuation mechanism to achieve the instructed transmission ratio, be the same. However, when an abnormality occurs, the request gear stage X1, the instruction gear stage Y, and the actual gear stage Z may differ from one another. More specifically, when the pressure of the hydraulic oil supplied to the transmission mechanism 36 from the hydraulic mechanism 50 is not controlled normally due to leakage of the hydraulic oil or the like, the transmission mechanism 36 may not achieve the actual gear stage Z corresponding to the control signal S. Even when the pressure of the hydraulic oil supplied to the transmission mechanism 36 is normal, if the transmission mechanism 36 is faulty, the transmission mechanism 36 does not achieve the actual gear stage Z corresponding to the control signal S. As described above, when the transmission mechanism 36 or the hydraulic mechanism 50 is faulty, even if the instruction gear stage Y, which is the gear stage corresponding to the control signal S, is normal, the actual gear stage Z does not equal the instruction gear stage Y. In the embodiment, the instruction gear stage Y is compared with the actual gear stage Z. When the instruction gear stage Y differs from the actual gear stage Z, it is determined that the transmission ratio of the transmission mechanism 36 is abnormal. Thus, occurrence of a fault in the transmission mechanism 36 and the hydraulic mechanism 50 is determined as an abnormality in the transmission ratio of the transmission mechanism 36. More specifically, occurrence of a mechanical fault in the transmission mechanism 36 and the actuation mechanism that actuates the transmission mechanism 36 is determined in accordance with whether the transmission ratio of the transmission mechanism 36 is abnormal.

(2) In addition to an abnormality of the transmission ratio caused by a fault in the transmission mechanism 36 and the hydraulic mechanism 50 as described above, an abnormality of the transmission ratio may occur due to an electronic signal error. More specifically, an error may occur, for example, when the request gear stage X1 calculated by the transmission ratio calculator 81 is written on or read from the volatile memory. In addition, the request gear stage X1 stored in the volatile memory may be changed due to reception of an external noise. When such an electronic signal error occurs, a control signal S is generated based on the request gear stage X1 after the occurrence of the error. Thus, the instruction gear stage Y corresponding to the control signal S does not equal the request gear stage X1. In the embodiment, the request gear stage X1 is compared with the instruction gear stage Y. When the request gear stage X1 differs from the instruction gear stage Y, it is determined that the transmission ratio of the transmission mechanism 36 is abnormal. Thus, occurrence of an electronic signal error such as that described above is determined as an abnormality in the transmission ratio of the transmission mechanism 36. More specifically, an electronic error that may occur from when a request transmission ratio is calculated to when a control signal corresponding to the request transmission ratio is output is determined based on whether the transmission ratio of the transmission mechanism is abnormal.

(3) In the embodiment, when the catalyst 17 is in the cold state, the request gear stage X1 is calculated using the emission priority map, which restricts an upshift of the gear stage, as the transmission ratio map. In other words, when the specified parameter (e.g., catalyst temperature TC) satisfies a first condition (for example, condition that the catalyst temperature TC is less than the warm-up determination temperature), the request transmission ratio is calculated using a first transmission ratio map (e.g., emission priority map). This is because the restriction of an upshift increases the rotation speed of the crankshaft so that the temperature of the catalyst 17 is increased to be greater than or equal to the warm-up determination temperature. From the viewpoint of the exhaust emission performance, there is a need for detecting whether the emission priority map is used as the transmission ratio map when the catalyst 17 is in the cold state.

When the catalyst 17 is in the warm state, the drivability priority map is used as the transmission ratio map to calculate the request gear stage X1. In other words, when the specified parameter (e.g., catalyst temperature TC) satisfies a second condition (for example, condition that the catalyst temperature TC is greater than or equal to the warm-up determination temperature), the request transmission ratio is calculated using a second transmission ratio map (e.g., drivability priority map). When the temperature of the catalyst 17 is greater than or equal to the warm-up determination temperature, the catalyst 17 is expected to sufficiently purify the exhaust. Hence, the need for detecting whether the drivability priority map is used or the emission priority map is erroneously used is low from the viewpoint of the exhaust emission performance.

In this regard, in the embodiment, when that the catalyst 17 is in the cold state and the emission priority map is used to calculate the request gear stage X1, a transmission ratio abnormality determination control series is executed on condition that the request gear stage X1 calculated using the emission priority map differs from the hypothetical request gear stage X2 calculated using the drivability priority map on the assumption that the catalyst 17 is in the warm state. Thus, whether the transmission ratio is abnormal is determined in a situation in which gear stages calculated using the transmission ratio maps differ from each other. This allows for acknowledgement of the possibility that the switching to the emission priority map is not done as expected when the catalyst 17 is in the cold state. When the catalyst 17 is in the cold state, the need for the transmission ratio abnormality determination control is low from the viewpoint of the exhaust emission performance, and thus a transmission ratio abnormality determination control series is not executed. This limits unnecessary increases in the processes of the controller 80.

The embodiment may be modified as follows. The embodiment and the following modified examples can be combined as long as the combined modified examples remain technically consistent with each other.

In the transmission ratio abnormality determination control of the embodiment, the combination of transmission ratios that are compared may be changed. Instead of or in addition to the determination processes in steps S54 and S62, for example, whether the request gear stage X1 equals the actual gear stage Z may be determined. Then, if the request gear stage X1 equals the actual gear stage Z, it may be determined that the transmission ratio of the transmission mechanism 36 is normal. If the request gear stage X1 differs from the actual gear stage Z, it may be determined that the transmission ratio of the transmission mechanism 36 is abnormal.

In this manner, any two of the request gear stage X1, the instruction gear stage Y, and the actual gear stage Z may be compared to determine the normality and abnormality of the transmission ratio. When multiple comparison combinations are used, if the gear stages differ from each other in any one of the combinations, it may be determined that the transmission ratio is abnormal.

In the embodiment, the calculation process of the catalyst temperature TC may be changed. For example, the temperature of a circulating oil circulating through the internal combustion engine 10 and the temperature of the hydraulic oil filling the hydraulic mechanism 50 change generally in the same manner as the catalyst temperature TC. The catalyst temperature TC may be calculated based on the temperature of the circulating oil circulating through the internal combustion engine 10 and the temperature of the hydraulic oil filling the hydraulic mechanism 50 instead of or in addition to the water temperature TW of the internal combustion engine 10 and the accumulated value of the intake air amount GA since the internal combustion engine 10 is started.

Alternatively, the catalyst temperature TC may be calculated based on, for example, the value of one of the water temperature TW of the internal combustion engine 10, the accumulated value of the intake air amount GA since the internal combustion engine 10 is started, the temperature of the circulating oil circulating through the internal combustion engine 10, and the temperature of the hydraulic oil filling the hydraulic mechanism 50.

In the embodiment, the specified parameter may be changed. The specified parameter indicating the state of the internal combustion engine 10 may be, for example, the water temperature TW of the internal combustion engine 10, the accumulated value of the intake air amount GA since the internal combustion engine 10 was started, the temperature of the circulating oil circulating through the internal combustion engine 10, or the temperature of the hydraulic oil filling the hydraulic mechanism 50, instead of the catalyst temperature TC.

In the embodiment, one of the emission priority map and the drivability priority map is selected in accordance with the catalyst temperature TC to calculate the request gear stage X1. The calculation process of the request gear stage X1 may be changed. For example, a gear stage may be calculated based on each of the emission priority map and the drivability priority map regardless of the catalyst temperature TC. The two calculated gear stages may be adjusted based on the catalyst temperature TC so that one of the two gear stages is selected as the request gear stage X1. Such a technique may produce an electronic error such as erroneous reading of a gear stage calculated using the drivability priority map when a gear stage calculated using the emission priority map should be read. With the abnormality determination control process of the embodiment, such an electronic error is determined as an abnormality in the transmission ratio of the transmission mechanism 36.

In the embodiment, the transmission ratio calculator 81 of the controller 80 selects one of the two transmission ratio maps, namely, the emission priority map and the drivability priority map, in accordance with the catalyst temperature TC. Instead, one transmission ratio map may be selected from three or more transmission ratio maps in accordance with the catalyst temperature TC. Furthermore, a single specified transmission ratio map may be used regardless of the catalyst temperature TC. Even in this case, the transmission ratio abnormality determination control of the embodiment determines whether the transmission ratio calculated using the transmission ratio map is achieved by the transmission mechanism 36.

In the embodiment, in addition to or instead of the escape traveling map, a further transmission ratio map may be used as a transmission ratio map that differs from the emission priority map and the drivability priority map. When the further transmission ratio map is used to calculate the request gear stage X1 regardless of the catalyst temperature TC, a part of the precondition determination control and the transmission ratio abnormality determination control may be configured not to be executed in the same manner as when the escape traveling map is selected in the embodiment.

In the transmission ratio abnormality determination control of the embodiment, in addition to merely determining that the transmission ratio is abnormal, the type of abnormality may be determined. For example, when the negative determination is made in step S54 of FIG. 4, it may be determined that the transmission ratio is abnormal due to a mechanical fault. When the negative determination is made in step S62, it may be determined that the transmission ratio is abnormal due to an electronic error. Such determination of different abnormalities helps to narrow down components that are subject to repair or maintenance.

In the embodiment, the reference time Tx in step S43 of the precondition determination control may be changed. More specifically, the degree of change in the catalyst temperature TC may vary depending on, for example, the type or size of the catalyst 17 and the position of the catalyst 17 in the exhaust passage 16. The reference time Tx in step S43 may be changed in accordance with the configuration of the vehicle related to the catalyst temperature TC.

In the embodiment, step S43 may be omitted from the precondition determination control.

In the embodiment, step S31 may be omitted from the precondition determination control. More specifically, there is a low probability that the water temperature TW becomes greater than or equal to the predetermined boil determination value B and the escape traveling map is selected. Therefore, in the vehicle 100, there is a high probability that the emission priority map or the drivability priority map is selected. In this regard, in the vehicle 100, step S31 may be omitted, and the precondition met flag may be set to ON based on the assumption that the emission priority map or the drivability priority map is selected.

The precondition determination control may be omitted from the embodiment. In this case, it may be determined whether the transmission ratio is abnormal in the transmission ratio abnormality determination control regardless of the precondition met flag.

In the embodiment, the configuration of the transmission mechanism may be changed. For example, a continuously variable transmission mechanism may be used as the transmission mechanism instead of the stepped transmission mechanism 36. When a continuously variable transmission mechanism is used, the configuration that compares two gear stages may be changed to a configuration that compares two transmission ratios in the technique described above. More specifically, in the transmission ratio abnormality determination control of the embodiment, when the two gear stages that are subject to comparison differ from each other, it is determined that the transmission ratios differ from each other by a specified value or greater. In the continuously variable transmission mechanism, when the difference between two transmission ratios that are subject to comparison is less than a predetermined specified value, it may be determined that the transmission ratios equal each other. When the difference between the two transmission ratios is greater than or equal to the specified value, it may be determined that the transmission ratios differ from each other. In the precondition determination control of the embodiment, it is determined that when two gear stages that are subject to comparison differ from each other, the transmission ratios differ from each other by a reference value or greater. In the continuously variable transmission mechanism, when one of the two transmission ratios that are subject to comparison differs from the other transmission ratio by a predetermined reference value or greater, it may be determined that the two transmission ratios differ from each other.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A transmission ratio controller including circuitry, the circuitry comprising:
   a transmission ratio calculator configured to calculate a request transmission ratio to a transmission mechanism in accordance with a state of an internal combustion engine;
   a transmission ratio instructor configured to transmit a control signal to an actuation mechanism based on the request transmission ratio, the actuation mechanism being configured to actuate the transmission mechanism; and
   an abnormality determiner configured to determine whether a transmission ratio of the transmission mechanism is abnormal, wherein
   at least two of the request transmission ratio, an instruction transmission ratio that is a transmission ratio corresponding to the control signal, or an actual transmission ratio that is a transmission ratio achieved by the transmission mechanism are transmission ratios subject to comparison, and
   the abnormality determiner is configured to determine that when a difference obtained by comparing the transmission ratios subject to comparison is greater than or equal to a predetermined specified value, the transmission ratio of the transmission mechanism is abnormal.

2. The transmission ratio controller according to claim 1, wherein the abnormality determiner is configured to determine that when a difference obtained by comparing the instruction transmission ratio and the actual transmission ratio is greater than or equal to the specified value, the transmission ratio of the transmission mechanism is abnormal.

3. The transmission ratio controller according to claim 1, wherein the abnormality determiner is configured to determine that when a difference obtained by comparing the request transmission ratio and the instruction transmission ratio is greater than or equal to the specified value, the transmission ratio of the transmission mechanism is abnormal.

4. The transmission ratio controller according to claim 1, wherein
   the circuitry includes a monitor configured to monitor the request transmission ratio calculated by the transmission ratio calculator,
   the state of the internal combustion engine is specified based on a specified parameter,
   the transmission ratio calculator is configured to calculate the request transmission ratio using a first transmission ratio map when the specified parameter satisfies a first condition,
   the transmission ratio calculator is configured to calculate the request transmission ratio using a second transmission ratio map that differs from the first transmission ratio map when the specified parameter satisfies a second condition,
   the first condition and the second condition are not simultaneously satisfied,
   when the specified parameter satisfies the first condition, the internal combustion engine is in a first state,
   when it is assumed that the specified parameter satisfies the second condition, the internal combustion engine is in a second state,
   the first state and the second state are identical except for the specified parameter,
   the monitor is configured to calculate a hypothetical transmission ratio based on the second state using the second transmission ratio map when the internal combustion engine is in the first state,
   the monitor is configured to compare the hypothetical transmission ratio with the request transmission ratio that is calculated when the internal combustion engine is in the first state, and
   the abnormality determiner is configured to determine whether the transmission ratio of the transmission mechanism is abnormal when the request transmission ratio calculated when the internal combustion engine is in the first state differs from the hypothetical transmission ratio by a predetermined reference value or greater.

5. A method for determining a transmission ratio abnormality, the method comprising:
- calculating a request transmission ratio to a transmission mechanism in accordance with a state of an internal combustion engine; and
- transmitting a control signal to an actuation mechanism based on the request transmission ratio, the actuation mechanism being configured to actuate the transmission mechanism, wherein
- at least two of the request transmission ratio, an instruction transmission ratio that is a transmission ratio obtained by converting the control signal, or an actual transmission ratio that is a transmission ratio achieved by the transmission mechanism are transmission ratios subject to comparison, and
- the method further comprises determining that when a difference obtained by comparing the transmission ratios subject to comparison is greater than or equal to a predetermined specified value, the transmission ratio of the transmission mechanism is abnormal.

\* \* \* \* \*